(12) United States Patent
Pratt et al.

(10) Patent No.: US 7,886,267 B2
(45) Date of Patent: Feb. 8, 2011

(54) MULTIPLE-DEVELOPER ARCHITECTURE FOR FACILITATING THE LOCALIZATION OF SOFTWARE APPLICATIONS

(75) Inventors: David Pratt, Woodland Hills, UT (US); David Stones, Woodland Hills, UT (US); Adam Friedman, Newtown (AU); Clinton De Young, West Jordan, UT (US); Stephen Gibbon, Wollstone Craft (AU); Edwin Ho, Maroubra (AU); Michael E. Sainsbury, Willoughby (AU)

(73) Assignee: Symantec Corporation, Mountain View, CA (US)

( * ) Notice: Subject to any disclaimer, the term of this patent is extended or adjusted under 35 U.S.C. 154(b) by 1169 days.

(21) Appl. No.: 11/528,497

(22) Filed: Sep. 27, 2006

(65) Prior Publication Data

US 2008/0127045 A1    May 29, 2008

(51) Int. Cl.
 *G06F 9/45* (2006.01)
(52) U.S. Cl. ...................................................... 717/104
(58) Field of Classification Search .................. 717/104
See application file for complete search history.

(56) References Cited

U.S. PATENT DOCUMENTS

| | | | | |
|---|---|---|---|---|
| 6,330,717 | B1 * | 12/2001 | Raverdy et al. | 717/170 |
| 7,509,374 | B2 * | 3/2009 | Trinh et al. | 709/203 |
| 7,555,757 | B2 * | 6/2009 | Smith et al. | 719/328 |
| 2003/0004703 | A1 * | 1/2003 | Prabhakar et al. | 704/8 |
| 2004/0117759 | A1 * | 6/2004 | Rippert et al. | 717/100 |
| 2005/0071803 | A1 * | 3/2005 | Cherdron et al. | 717/101 |
| 2006/0168555 | A1 * | 7/2006 | Represas Ferrao et al. | 717/104 |
| 2006/0176403 | A1 * | 8/2006 | Gritton et al. | 348/581 |

OTHER PUBLICATIONS

N. Drakos, E-Business Globalization Vendors: Where's the Value?, Sep. 28, 2001, Gartner Research.
CEO/Company Interview with Mark Lancaster SDL International Plc, Jun. 12, 2000, The Wall Street Transcript, New York, NY.
How TMX Helps You Achieve a Higher Return on Your Investment in Translation and Localization, Feb. 12, 2003 (?), Localization Industry Standards Association (?).
How to use SDL Align, Mar. 13, 2003, SDL International Plc.
How to use SDL Termbase, Mar. 13, 2003, SDL International Plc.
Preliminary Results for the Year ended Dec. 31, 2003, SDL International Plc.
SDLX 2004 Technical Datasheet, May 4, 2004, SDL International.

(Continued)

*Primary Examiner*—John Chavis
(74) *Attorney, Agent, or Firm*—Advantedge Law Group

(57) ABSTRACT

Disclosed herein are systems and methods providing for autonomous extraction of original natural language strings from source code and insertion of translated strings therein. Some of the examples described herein additionally utilize a database suitable for containing translations of user-viewable material and for accessing that material from developer project sandboxes. Individual developer projects may provide for the extraction of natural-language strings from source code to a shared translations database. Detailed information on various example embodiments of the inventions are provided in the Detailed Description below, and the inventions are defined by the appended claims.

21 Claims, 4 Drawing Sheets

OTHER PUBLICATIONS

SDLTermBase Online Product Brief, Aug. 25, 2005, SDL International.
SDLPhraseFinder Product Brief, Apr. 14, 2005, SDL International.
SDLX Product Brief, Jul. 4, 2005, SDL International.
SDL Translation Memory, Aug. 24, 2005, SDL International.
SDLTrados TM Server Product Brief, Jul. 26, 2006, SDL International.
SDLTranslation Management System Product Brief, Oct. 9, 2006, SDL International.
Global Information Management Solutions: Global Authoring, Jan. 8, 2007, SDL International.
Trados 7 File Formats Reference Guide, Jun. 27, 2007 (2005?), SDL International.
Trados MultiTerm Terminology Solutions Administrator's Guide, Jun. 27, 2007 (2003?), SDL International.
Trados MultiTerm Terminology Solutions Extract Guide, Jun. 27, 2007 (Jul. 2003?), SDL International.
Trados MultiTerm Terminology Solutions User Guide, Jun. 27, 2007 (Jul. 2003?), SDL International.
Trados 7 S-Tagger User Guide, Jun. 27, 2007 (Jun. 2005?), SDL International.
Trados 6.5 Translator's Workbench User Guide, Jun. 27, 2007 (Jun. 2004?), SDL International.
Trados 6.5 WinAlign User Guide, Jun. 27, 2007 (Jun. 2004?), SDL International.
SDL MultiTerm: Delivering the right word through CCM Methodology, Jul. 2, 2007, SDL International.
SDL Trados 2007 Freelance Product Summary, Jul. 4, 2007, SDL International.
Alchemy TRADOS Component V2 web page at http://www.alchemysoftware.ie/products/trados.html, Jul. 5, 2007, Alchemy Software Development Ltd. of Dublin, Ireland.
Alchemy Catalyst 7.0 web page at http://www.alchemysoftware.ie/products/catalyst.html, Jul. 5, 2007, Alchemy Software Development Ltd. of Dublin, Ireland.

* cited by examiner

MULTIPLE-DEVELOPER ARCHITECTURE FOR FACILITATING THE LOCALIZATION OF SOFTWARE APPLICATIONS

REFERENCE TO COMPUTER PROGRAM LISTING APPENDIX

Filed with this application is a CD-R labeled 'Computer Program Listing Appendix for the US utility application entitled "Multiple-developer architecture for facilitating the localization of software applications"', in duplicate, containing a program listing appendix. The files contained thereon are hereby incorporated by reference, which are listed in Appendix I, below.

BACKGROUND

With the widespread international use of software, producers of software have had a need to translate information displayed to a user to the natural languages of countries and localities where that software is to be marketed or sold. The method depicted in FIG. 1 represents one common method, useful to illustrate the issues associated with that translation as it relates to software development.

The software to be developed is authored in source code 10, which is rendered in a programming language. Source code 10 may be manipulated to produce an application 12, which is installable and executable on a destination computer, for example a user computer. Presently, the production of an application 12 may be rendered in any number of ways through a processor 11, which might compile and/or package the objects of the application 12 for use. If application 12 is compiled, then processor 11 will include a compilation step. Likewise, if application 12 is interpreted, source code may not need to be rendered into a non-original format, and may simply be packaged into an installation object. The principles disclosed herein relating to translation apply generally regardless of the type of application production process used.

Source code 10 traditionally has embedded therein certain messages for the end user, for example in the form of "print" statements. In its usual format, source code is generally not suitable for translation. Most persons who perform translation services are not skilled in programming, and therefore may err in translating text that is not destined for the end user (statements in a programming language) and may also miss user messages embedded deep within the source code.

For this, and perhaps other reasons, a practice has developed of placing the user-viewable messages, which are in the example of FIG. 1 merely textual strings, into "resource files". A resource file 13 contains user-visual content of the application, separated from and referenced by the source code 10. As source code 10 is compiled, packaged or otherwise processed, the resource file is included through source code references. A resource file 13 is generally simplified in format to make it easy for a translating person 14 to identify the content needing translation. Ideally, the translator 14 may edit the resource file 13, replacing the messages in the developer's language with messages in the language of the end user. Such an edited file 15 may be referenced by the source code 10, which in the course of application production produces a localized application 16 with translated messages in the language of an end-user.

This method of resource file usage has certain disadvantages. More apparently, the creation of a resource file may be laborious and expensive, requiring potentially some work on the part of a software developer to identify and isolate the natural language content needing to be translated. However, some modern application development suites can automatically create and maintain resource files, particularly those for writing graphical user interface applications, so this disadvantage is by no means universal.

This method also interferes with the software development process. Software development is largely concerned with the functionality of an application, for example the interaction between the application and other applications, devices and data. Generally speaking, the internals or "guts" of an application are first built and tested, followed by refinement of the "look and feel." The normal course of development uses only the user-visual information in the language of the developers until nearly the end of the development cycle, shortly before product release.

Because in most of the early development the user interfaces are incomplete or in flux, resource files are typically sent out for translation late in the development cycle when the application and the user interface becomes reasonably stable. Unfortunately, some translations are difficult to get performed rapidly, which can result in a delay in the release of an application of several weeks to months. The alternative is to release an application early in the developer's language, followed by a subsequent international release. However, it may be that the application at that time will include bug fixes not in the initial release, which can lead to problems with application support. Additionally, the user interface must be frozen during this time of translation, as the addition or change of functionality might require additional translations, which can prevent additional features or functionality from appearing in a localized software product.

Furthermore, in that method frequent updates to the resource files are cumbersome. Although it is possible for a resource file to be submitted early to a translator, doing so can lead to unnecessary translations and expense. Translation services are typically operated "in bulk", meaning that a service will accept for translation a large quantity of material in print or electronic document format. These services typically charge by the line, word or string, so if there is a duplicated string in the source code, as there often will be, a translator is likely to slavishly translate the material in a once-through procedure, and merrily charge additional fees for the duplicated material. Additionally, these services are generally not equipped to compare a previously submitted document with another, and provide only translations for the updated material. Thus it is left to the developer to manually extract updated strings and eliminate any duplicates, or otherwise incur additional costs for the translation of redundant material.

BRIEF SUMMARY OF THE DISCLOSURE

Disclosed herein are systems and methods providing for autonomous extraction of original natural language strings from source code and insertion of translated strings therein. Some of the examples described herein additionally utilize a database suitable for containing translations of user-viewable material and for accessing that material from developer project sandboxes. Individual developer projects may provide for the extraction of natural-language strings from source code to a shared translations database. Detailed information on various example embodiments of the inventions are provided in the Detailed Description below, and the inventions are defined by the appended claims.

Reference will now be made in detail to some embodiments of the inventions, examples of which are illustrated in the accompanying drawings.

DETAILED DESCRIPTION

Overview Example

Figure 1:
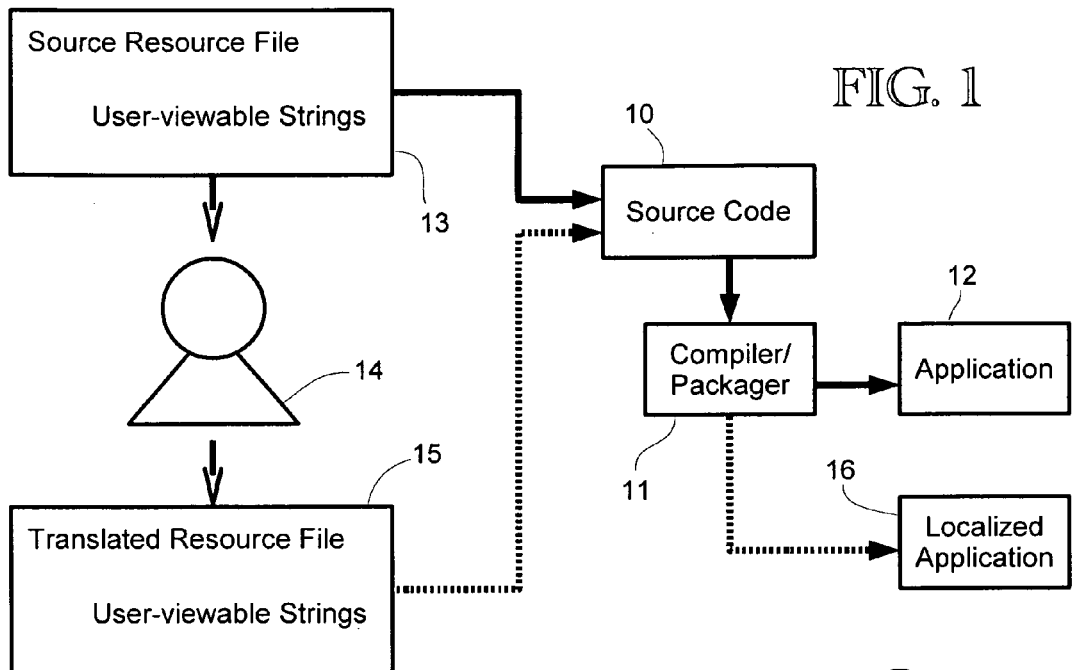
FIG. 1 illustrates a common method of localizing software.
Figure 2:
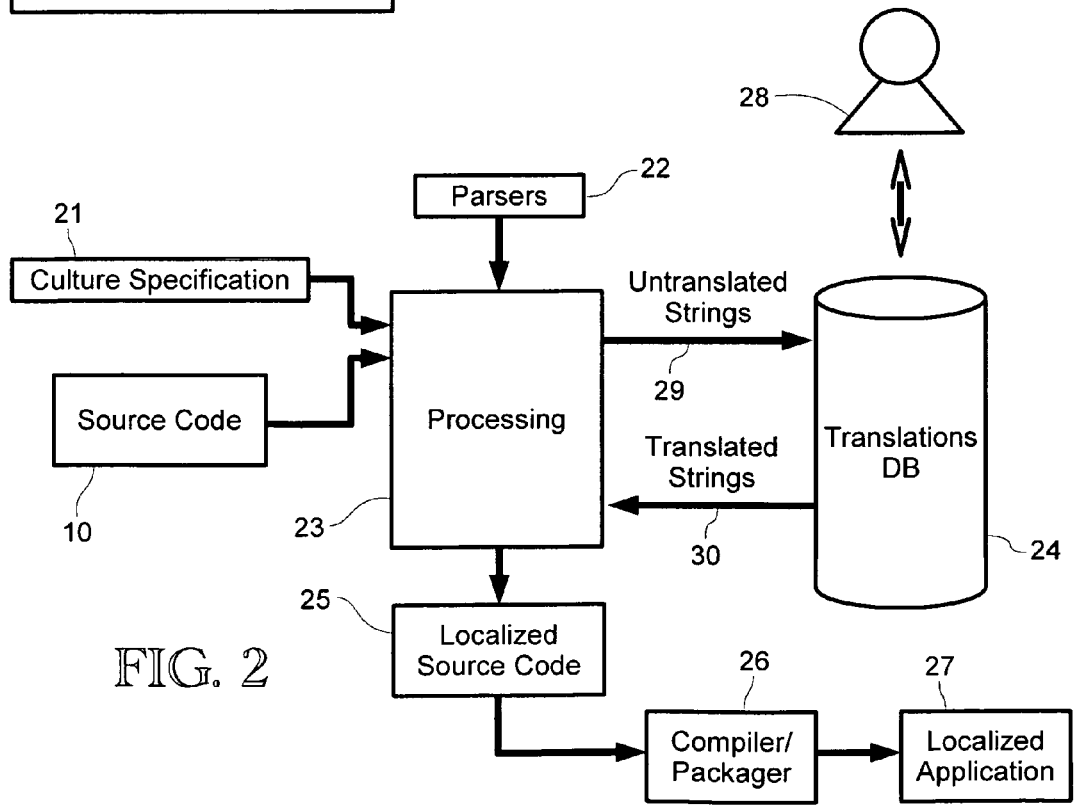
FIG. 2 conceptually illustrates an exemplary development system that utilizes a translations database.

First referring to FIG. 2, a system that utilizes a translations database 24 and a source code processor 23 can alleviate many of the problems identified above. In that system, source code 10 is developed, perhaps in the usual ways of the art. At various times, source code may be input to a processor 23 for the extraction of natural language strings. This extraction is performed through the use of parsers 22 that identify these natural language strings; the construction of such will be discussed below. The product of processor 23 is any number of untranslated strings 29, which are saved into a database 24. Database 24 may also conveniently store translated strings, as shown. Although it is not required, database 24 may be a relational database indexed by a pair, hash or other key formed from source information extracted in parsing (which might be an untranslated string) and the name of a language or locality. The value associated with a key may be a translated string, or may be a value that indicates that no translated string is present, for example the empty string or the reference string duplicated. Database 24 or other translations databases described herein may take many other forms, including a simple textual comma or tab -separated database, or any other indexable form suitable to associate a translated string to an untranslated one.

As untranslated strings are accumulated into database 24, they may be submitted to a translator 28. Translator 28 returns the translated strings for entry into the database. The transfer of strings between database 24 and 28 may be accomplished in many ways. For example, an interactive interface might be constructed to be accessible by a translator, which could be made network-accessible for access to off-site translators. A translation database might also be copied and sent to a translator, and returned with translations included. Or, a printout or electronic file can be made of the untranslated strings for the translator, and likewise the translations can be entered into a database manually. Regardless, translations 30 entered into database 24 are made available to the processor 23.

When it is desired, the system of FIG. 2 can operate to insert translated strings as required into the source code 10. A culture specification 21 may be used to select one or more languages or localities with which the final application is to conform. The culture specification 21 can include more than identification of a locality; for example it may be desirable to include typefaces, fonts, direction of writing, sizes, styles, and other customizations. Regardless, processor 23 may read a culture specification, which may identify the translations to request from database 24.

Processor 23, in the insertion mode, may utilize parsers 22 again to pick out the original untranslated strings without reference to a previous parsing state. This deterministic method is useful not only for its improved debugging of parser operation, but also permits the insertion of translations that may exist in the database before the first run of processor 23. By discarding the previous state and output files, the updating of source files from translated output need not be undertaken and potential bugs and build problems are avoided as the source code is not 'touched'. In an alternative method processor 23 may rely on references to or cues left previously in source code 10 in an earlier parsing operation.

Turning aside for a moment, a translations database may be paired with a source code project. Although that can be done while obtaining many advantages, it may be desirable to reuse a translations database among succeeding projects or share it between several projects. Although it may not be immediately apparent why, consider that some applications use many strings in common. For example, graphical user interface applications often use words such as "OK", "Cancel", "Open", "Close", "Exit", "Error", "Help" etc. By recycling translations from one project to another, translation costs for these common words and phrases can be avoided. Additionally, a partially localized application can be produced early in the development cycle, which may be helpful for debugging purposes (for example detecting a dialog box that overruns its space due to a long translated phrase) or in more widespread alpha or beta testing that includes several localities.

Returning to FIG. 2, the output of the translation insertion step is localized source code 25. This localized code might include modified resource files with other original source material. It might also include code with embedded natural language strings, or any other format as desired. The localized code, with or without other objects, may then be passed to a compiler, packager or other finishing stage, producing a localized application 27.

Parsers may be created to service the languages, architectures and styles of the source code used. Referring back to the example of FIG. 2, one parser may be created for individual format types where natural language appears in the source code. For example, some programming techniques utilize resource files that contain natural language but little or no functional programming. An example of this are ResX files of the Microsoft ".Net" architecture, in which natural language strings are stored with reference to XML tags, convenient for parsing. Other programming architectures may utilize resource files with other visual informational content. Parsers may also be constructed for files having both natural language and functional content. For example, many graphical interface languages include standard templates for creating dialog boxes and menus. Knowing these, it is not difficult to create a parser capable of extracting the textual information used. If the C language were being used, it is not difficult to identify print and sprint statements, although some additional steps may be desirable to detect and avoid the translation of internal references to run-time objects.

Where code may contain both functional and natural language strings, it may be difficult to separate those needing translation from those to be passed unmodified. Rather than attempting to customize a parser specifically for a source code file, it may be desired to provide cues to the parser. For example, in a C language file, if the next line is to print some non-translatable output, for example a debug message or a setting in an application configuration file, a parser could be implemented that would pass by the next string after a "/*DNT*/" comment (Do Not Translate). Thus, the parsers used can be responsive to cues left in the code by the developers.

It may be desirable to map parsers by file type. Thus, in the example of FIG. 2, processor 23 iterates through the files comprising source code 10, and examines the file extension of each. Therein, the .c files are parsed by the C language parser, the .resx files are parsed by the ResX parser, etc. Files that do not become part of the application or are to be translated separately, for example .txt files or Makefiles, may be passed through without parsing or may be parsed by a null parser. There might also be a default parser for handling those files with an unidentified extension or file type, which might advantageously be flagged for a developer to review for proper processing. File types may also be identified by file permissions, by content (for example a "#!/usr/bin/sh" as the first line), by computation of "magic" numbers, by a schedule or manifest, or by any other method. Other parser organizations may be used as well, and one need not limit himself to a one-to-one parser to extension scheme. For example, a universal parser might be used that can discriminate between the various formats and syntactical contexts that it may be exposed to.

Refer now to Code Sample 1 listed in Appendix I. Code Sample 1 illustrates one implementation of parsing and translation processing system, operable to extract strings and insert translated strings to and from a code base. That parsing system operates to transverse a source code directory structure, identifying files for which a parser is indicated. A parser is selected from the parsers directory depending on the type of file being processed. As the system runs, directories are created for each locality produced. A copy of each source file, whether translated or not, appears in each locality directory, thereby creating a localized copy of the entire software project for each locality selected. The original files are left in -tact, which is useful if further software development is to occur.

As the system progresses through potentially translatable strings, lookups are performed in the translations database to identify strings that do not have an entry therein. These lookups may, if desired, be limited to a specific set of localities for which translations are expected to be needed, if a database stores translations for several localities. As these are potentially translatable strings are found, they are added to a "needs to be translated" list, which may either be directly supplied to a person managing the outsourcing of the string translations or accumulated for later management. Where a translation is needed but not available in the translations database, the system enters the original string prefixed and postfixed with markers for debugging purposes so it is easily identifiable as untranslated when the application is run.

Networked Application Alternative

Figure 3:
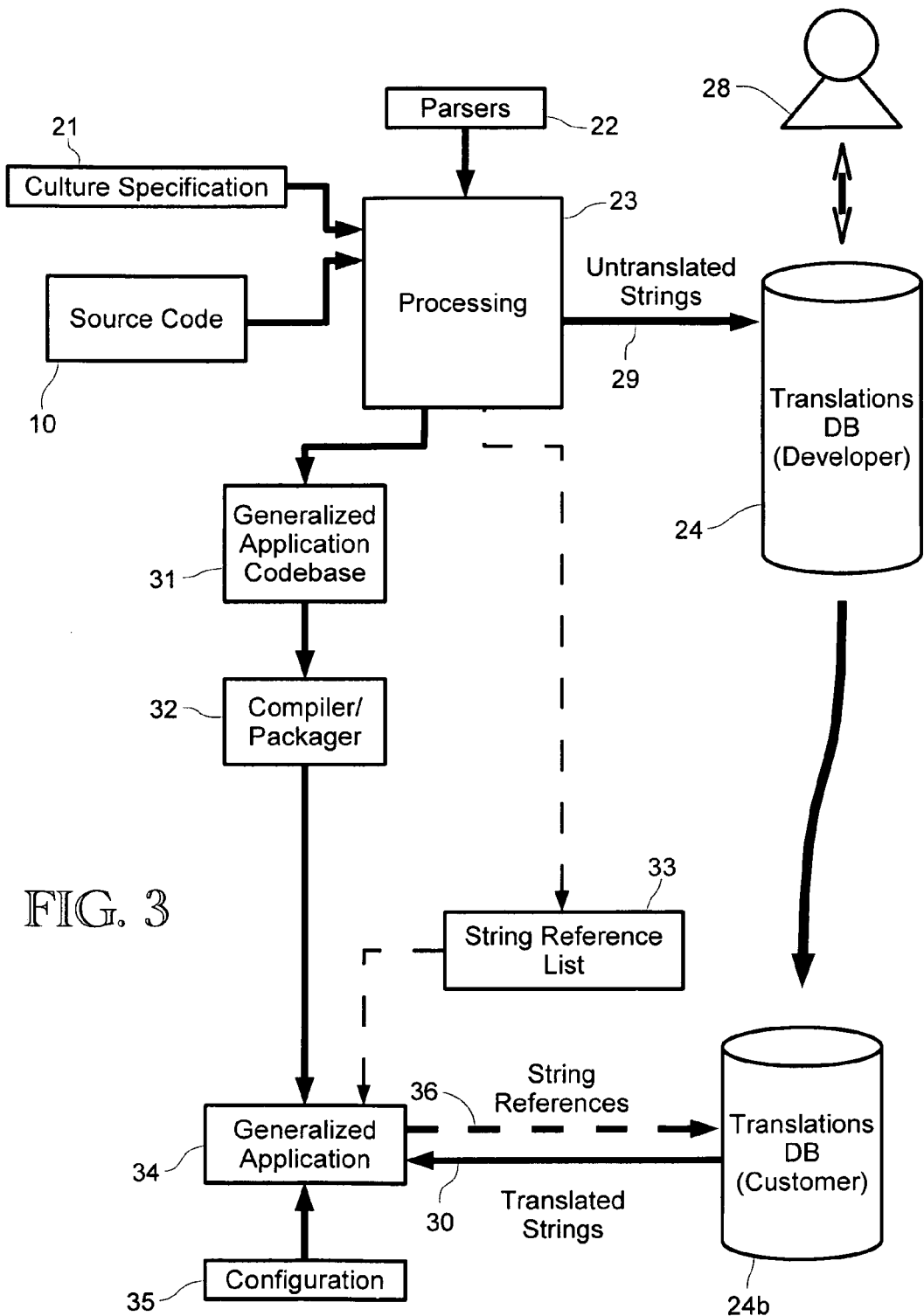
FIG. 3 shows an exemplary development system using a translation database in conjunction with a customer system utilizing a customer translation database.

In an alternative to the system shown in FIG. 2, an application need not include a resource file, but rather may refer to a translations database local to a user or customer. The system of FIG. 3 shows such a system in contrast to FIG. 2, and similarly includes source code 10, a culture specification 21, a processor 23, parsers 22 and a translations database 24 made available to the software developers. The application 34 produced by this system is a generic one, and may be a component of the application as installed in several localities. This is accomplished by the inclusion of string references 36, used to interact with a customer translations database 24b, which is operable to return translated strings 30. String references can be, conveniently, the original natural language strings, or may utilize another format as desired. Interaction between application 34 and database 24b may be by way of a network as described below, but virtually any method of interaction may be used that is suitable to the customer or end-user's computer configuration.

The customer translations database 24b contains translations from database 24. A complete set of translations for application 34 is desirable, but if a translation is not available to application 34 it may use a string reference instead, which might be a message in the original language. The content of customer database 24b may be varied, and may even be a direct copy of a common database, such as 24. In that case, if the customer chooses to license or purchase additional applications from the software supplier, potentially no additional databases are needed to be provided. A customer translations database may also contain translations for more than one locality. The selection of a locality may be by way of configuration 35 available to the application 24 by any conventional method.

The creation of application 34 has the following notable differences. First, processing 23 may produce a generalized application codebase 31. This codebase may have string definitions existing in the original source code 10 replaced with functional calls for lookups in a translation database. These string definitions may be extracted to a separate list 33 for later packaging, compilation or execution. The application 34 is created from codebase 31 as before by way of compilation, application packaging or other related processing steps. In FIG. 3, the string reference list is a file of original strings, sequentially listed. Here, application 34 may reference these by line number or other sequential reference. Alternatively, a string reference list may be input to the compiler/packaging step, thereby producing an application with the references built-in. List 33 may even be made a part of codebase 31, and the examples and configuration shown in FIG. 3 may be varied without departing from the inventions presented here.

A system as in FIG. 3, with a customer database, may gain an advantage. An application 34 may exist on one computer, or on many computers at the customer's site. A translations database 24b could be only installed to one one server in a network. Thus, if updates to the application translations are needed, only one update operation at one computer is needed. Customer database 24 might also be maintained by the application provider, where updated translations may appear without any action by a customer. A database 24b need not be located within a customer's network, but could be available through a wide-area network or even the Internet. Care should be taken, though, not to locate a customer database 24b too far away, or inconvenient delays may be noticed in the use of the application 34. However it may be more convenient to provide database 24b at a considerable distance from a user, for example where frequent changes are made by the application vendor to the database, which may occur during beta-testing, for example.

Finally, although the use of a customer translation database is shown in comparison with an exemplary system depicted in FIG. 2, the substitutions presented in FIG. 3 may be applied to virtually any user-interactive application, and especially to applications that multiple-locality capable. Developers of applications may utilize these principles disclosed in the paragraphs above in variations of these systems to achieve the advantages described above.

Parser Location Configurations

Reference is now made to U.S. Patent Application Publication US 2005/0050526 A1 to Dahne-Steuber et al.

("Dahne"), which is hereby incorporated by reference. That Publication describes a process of providing translations through parsers, and some of the techniques used therein may be applicable to systems described herein. Even so, it will be useful to contrast systems described further herein, thereby making apparent certain advantages.

Figure 4:
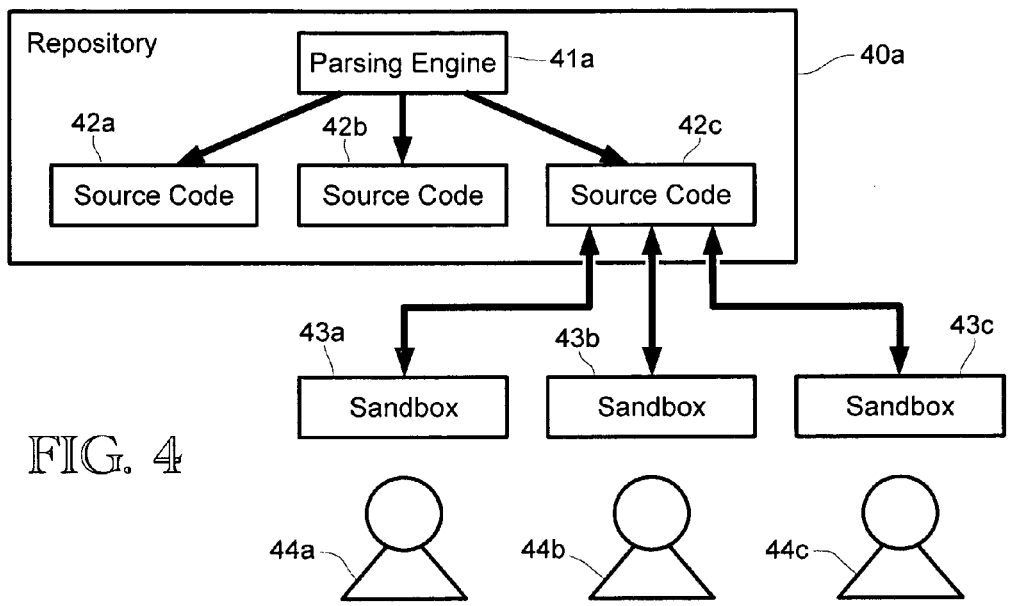
FIG. 4 depicts one development configuration that locates a parsing engine within the control of a source code repository.

Referring now to FIG. 4, it is a common practice to retain software projects in a repository 40a, which Dahne refers to as a "code database". Repository 40a contains several data stores representing, in this example, three source code projects 42a-c in various states (often, source code repositories keep prior versions in the event that a change needs to be "rolled-back".) Here, source code project 42c is being developed by three developers 44a-c, who have originally accessed or checked-out project 42c and may each make changes to the source code project 42c. Those changes are typically made in a sandbox 43a-c, which each developer maintains for herself to "play around" with the code while not disturbing the source code 42c stored in the repository 40a. Also for code in a sandbox 43a-c, the source code may be built to an application or executable for testing or for a production build. When a developer first obtains a copy of source code from a repository, that operation is referred to as "checking out" the code. The repository may or may not track who has outstanding copies of projects contained therein. When a developer finalizes changes to the source code in her sandbox and wishes to commit those changes to the repository, she initiates a "check in" operation, during which her copies of the source code are compared to the ones in the repository. If a file has been changed by two developers simultaneously, those conflicts are normally resolved through interrogatories made by the repository system or its software.

Continuing with FIG. 4, repository 40a includes a parsing engine 41a which could be activated on check in of source code as described by Dahne, but could also be activated at some time afterward as well. Parsing engine 41a produces translations as described above, which may be deposited back into a source code project or elsewhere as desired.

The location of parsing engine 41a in repository 40a is a natural choice, as it is relatively simple to implement and because the usual model of software development requires that the sharing of program information occur through the repository. In a system as depicted in FIG. 4, if translation databases are kept as local files, no interprocess or network communication is necessary. This simplicity, however, comes at a development cost. When it becomes desirable to identify content for a human translator, the developers must all check-in their code or risk non-inclusion of potentially important strings. As it is unlikely that all of the developers will have stabilized their code at a convenient time for translation, this system will necessarily incur a delay, either because the developers will have to stabilize their code for this interim release, or because software will be checked in having insufficient developer testing. If a problem is introduced into the repository, it might generate a bug report which would need to be tracked and later confirmed to be fixed and may make the software partially or wholly inoperable, both increasing the cost of checking in an incomplete change.

Figure 5:
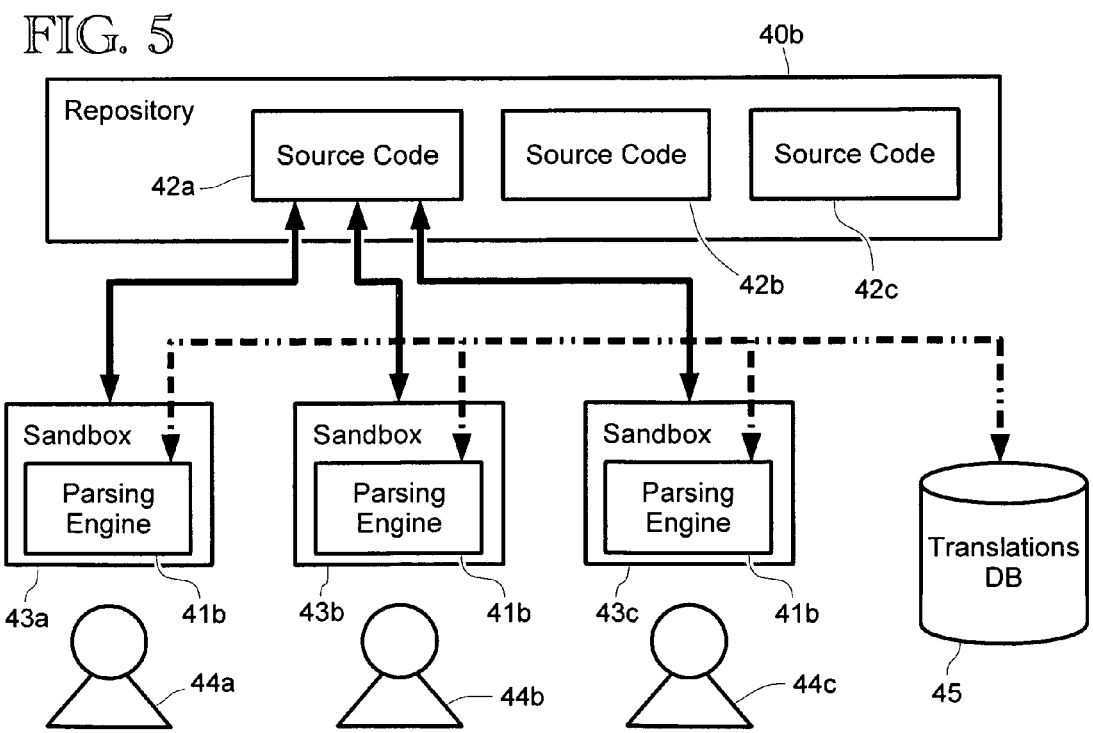
FIG. 5 depicts another development configuration that utilizes parsing at a developer's computer while accessing a shared translations database.

An alternative is depicted in FIG. 5, using the same source code projects 42a-c, developers 44a-c and sandboxes 43a-c. The alternative repository 40b does not include a parser. Rather, the parser 41b is made a part of or exists in conjunction with the software project build procedure. Thus, the parsing and/or translation procedure may be performed in the sandbox in connection with or in addition to the usual project build procedure at the developer's convenience. Thus, the development team might decide that a particular time is good to generate a list of untranslated strings. At that time, each developer need only finalize the strings under her control in the version of the software project in her sandbox, but she need not correct any bugs that might be present, nor complete any functionality. As each developer executes the parser in her own sandbox, no check in is needed and no bugs are introduced into the repository. A more freestyle procedure can also be followed, permitting each developer to perform the parsing procedure independently and out of synchronization of the other developers.

Now if a parsing and/or translating step were to include only local files, the result could be three sets of output, or three lists of untranslated strings. These could be merged, either manually, by a processing at the time of check-in or another method. Referring again to FIG. 5, it may be convenient to maintain a translations database 45 accessible by the parsing engine copies 41b where each sandbox 43a-c is located. By utilizing a shared translation database resource between developers, no separate merging step is needed and no additional work for the developers 44a-c is introduced. The method of communication between a parsing engine 41b and a translation database 45 can take many forms. For example, if all of the developers are located on the same mainframe, the translation database might be a file accessible through ordinary file access methods. Alternatively, if the developers are located on different computers, a translation database could be passed around on a floppy disk, or more currently on a USB storage device. If the developers make use of networked computers, then access could be by a networked hard drive, an ordinary database network interface or by a network service. A database access service can be provided for access of a translations database, whether this constitutes a local access (through interprocess communication, for example) or remote access (through network communication.) These and many other methods are possible, and the no-merge advantages can be had if the copies of existing parsing engines can access a common translation database.

If a network service is used, it may act as a network front-end to the translation database. Thus, requests from an extracting or inserting processor may be serviced. For example, one permissible request may be a 'exist' query, testing for the existence of a database entry corresponding to a natural language extraction. An 'add' request might be used to add an untranslated string. A 'read' request might include as arguments a string and a locality specification, returning the translation of that string for insertion. A 'list' request might return a list of the untranslated strings for a specified locality, and so forth. A network service could be implemented in any number of protocols, including a text-based one. A network service might also include a web service or an HTML-based protocol, permitting interaction with a translation database through a web browser, which may be especially convenient for providing an interface for a translator, printing lists of untranslated strings and entering in translated ones, and for debugging purposes.

Integration Language Packs

The source code described in connection with FIG. 5 and its build system can be manually constructed. Thus, a developer may create an initial project, perhaps by copying material from a prior project. He would then adjust any configuration necessary to conform with the new localities of interest, and to point to the correct translation database location and access methods.

An alternative to manual creation is to create a project template that includes not only build instructions and/or configuration, but also a set of parsers suitable for the extraction of natural language strings from source code in the languages of the project. A integration language pack, as it is referred to here, includes or refers to the parsers for at least one of the programming languages used, thereby creating a common container for a software project and its translation extraction and/or insertion tools (or references thereto.) If desired, parsers can be incorporated to a project template, thereby providing for string extraction independent of a development environment. Alternatively, the parsers and processing objects of string extraction may be made part of a development environment, providing a location for updates of those objects common to all projects under development. As suggested above, several projects can reference a common translations database, and may provide for early partial localization of an application. Thus, it may be desirable to include a reference to the common translations database in the project template. There may also be included a language or locality specification which could be manually adjustable, or alternatively a tool could be made available within the tool for creating a project, permitting the selection of localities from an available set.

Figure 6:
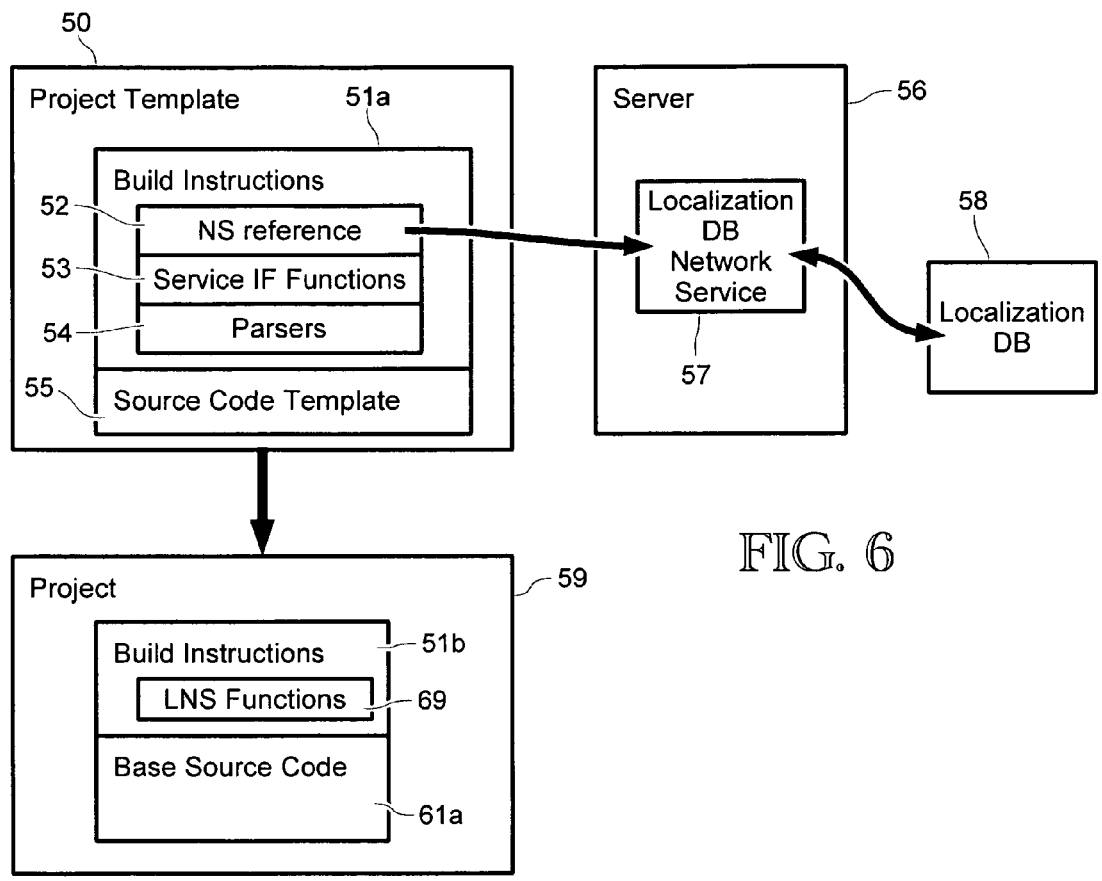
FIG. 6 conceptually illustrates the creation of a project from an exemplary project template including facilities for parsing and building source code.

Refer now to FIG. 6, depicting a project template 50 and a project 59 created therefrom. Template 50 includes the usual project template elements, including build instructions 51a and a source code template into which a developer may insert his code. Build instructions 51a typically include instructions for compiling or packaging the source code template 55, or its derivatives, into an executable form. Even so, a project template could omit build instructions under certain circumstances, for example if no build is needed (for interpreted languages) or if it is left to a developer to build her own building scripts.

In this example, natural language extraction and/or translation insertion elements are included in the build instructions. These elements are located here in the example for convenience, and no particular location is needed so long as the template includes or references any needed objects. These elements here include parsers 54 suitable for extracting natural language strings, service functions 53 for interfacing with a network service or other database interface, and a reference 52 to a network service or location of interfacing to a translation database 58. At some time and as translation services are needed, NS reference 52 points to a network service 57 or other database front-end, and in this example NS reference is a network reference that points to a particular server 56 which runs the service 57 and optionally database 58.

Project 59, created from template 50, includes base source code 61a, created from the source code template 55, which may be a starting point for development. Build instructions 51b are created from build instructions 51a. Build instructions may, as desired, be modified for a particular project, for example assigning a name, a network repository and other configurable items. Included in build instructions 51b, again by way of example, are localization/network service functions, which may include suitable portions of objects 52, 53 and 54 for parsing, extracting and inserting as described above. Functions 60 may include the NS reference 52 passed from the template, thereby configuring the project to use a common translations database. Project 59 may then be utilized by the usual software development practices, and may from time to time be subjected to localization as described above.

Figure 7:
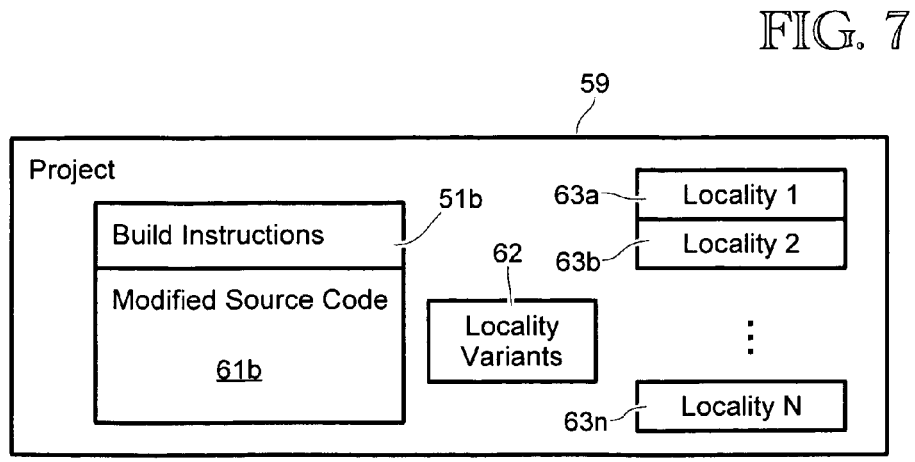
FIG. 7 conceptually illustrates the state of an exemplary software project created from a template at a time when development is underway.

Continuing further in FIG. 7 and in further detail, as development proceeds the project 59 will include source code 61b as modified by development activities. Developers may indicate which localities are to be used, which may be stored in a configuration file 62. Translated files may be stored in locality directories 63a-n, separated by locality and each containing the files or content necessary to localize the software project to a destination locality. Locality directories 63b may include merely resource libraries or files, but may also include source code and build instructions making each its own mini-project producing a complete application for a specific locality.

A convenient platform for template use is one of any number of development environments available for software project management. Code Sample 2 includes exemplary source code operable as a plug-in to the Microsoft Visual Studio suite, including code operable to create a new project from a built-in template. A 'studio' application need not be used, however, and a project can be created from a template by way of a shell script, or using a graphical or other desired environment. A template may contain programming adapted for a studio application, and might include programming that utilizes a particular directory structure and initially creates and maintains this as code is developed and as translation activities occur.

Code Sample 3 represents the contents of a 'TransatableSolution'.net project made by a template according to Code Sample 2, both of which are operable in Visual Studio .NET 2003 from Microsoft Corporation of Redmond, Wash. This template does not include parsers or a control program, rather these are integrated into Visual Studio as a plug-in. At the creation of the TranslatableSolution project, locality directories (de, es, fr, etc.) were created. At a time selected by the development team, extractions may occur by the selection of the "Extract Localization Invariants" menu item. The methods to communicate with and location of the translation database were passed from the template in a configuration file by the name "TranslatableSolutionLP.nslproj." The translation database is fronted by a web service in the ASP.NET 1.1 architecture. As insertion of translated strings occurs, the modified source files are deposited into these locality directories.

When the developer desires for translation to occur he selects "Update Language-dependent Files". This causes the project to copy all localization-invariant files into the language dependent culture-specific directories, while deleting any previous files with translations that may have existed there. A translation session is then initiated, beginning with the parsing of files and the updating of the files in the culture specific directories with language translations from the network service. When complete, the files in the culture specific directories contain either translated strings of strings prefixed with characters indicating no translated string was available at that time. In addition, a submission of new strings (strings not found in the translations database needing translation) is submitted to the network service for further processing.

While the present systems, products and methods have been described and illustrated in conjunction with a number of specific configurations, those skilled in the art will appreciate that variations and modifications may be made without departing from the principles herein illustrated, described, and claimed. The descriptions above refer to text strings, mainly for clarity. Where text strings are used, they need not be restricted to any character set; it may in some circumstances be desirable to use ASCII encodings, and in other cases wider character sets such as UTF-8. No particular format or character set is required. Likewise, it may be desirable to use the systems above for images, sounds or other objects that include a locality-specific property. For example, an image that contains text may need to be substituted for differing localities. Likewise, where speech audio is used, or where a text-to-speech engine is included, substitutions may be made of audio content or of a voice pattern in the character used in a locality. Thus, the systems described herein are operable generally to text strings, images, sounds, or any other user-viewable content placed into an application. Original strings may conveniently provide a reference key for a database; where objects are used that are unsuitable for direct insertion as a reference, those objects may be assigned names or identifiers can be computed by other methods such as a checksum or hash computation.

Similarly, the systems and methods of operation described above can operate in a networked or distributed fashion. For example, parsers may be provided by a server accessible through a network service, with a local processing program transmitting source code files to the service. Translated source code or material could be returned by the parser service, if a locality specification were previously received. Automatic processing and dispatch of source code files to parsers may also be omitted. For example, a developer may manually dispatch one or more source code files for parsing, which might be by execution of a parser at a command line with a source code files specified as command line arguments, or a developer might simply email the source code files to a network parsing service, as two examples.

Therefore the present invention, as defined by the appended claims, may be embodied in other specific forms without departing from its spirit or essential characteristics. The configurations described herein are to be considered in all respects as only illustrative, and not restrictive. All changes which come within the meaning and range of equivalency of the claims are to be embraced within their scope.

APPENDIX I—LISTING OF PROGRAM LISTING APPENDIX ON CD

Code Sample 1:

In the directory OldParsers/autoparse:
1078 2006-08-14 09:05 App.ico
2426 2006-08-14 09:05 AssemblyInfo.cs
6885 2006-08-14 09:05 AutoParse.cs
5091 2006-08-14 09:05 AutoParse.csproj
281 2006-08-14 09:05 AutoParse.csproj.vspscc
7705 2006-08-14 09:05 AutoTranslator.cs
197 2006-08-14 09:05 mssccprj.scc
128 2006-08-14 09:05 vssver.scc In the directory OldParsers/parsers:
1078 2006-08-14 09:05 App.ico
2426 2006-08-14 09:05 AssemblyInfo.cs
619 2006-08-14 09:05 ILocalizationParser.cs
188 2006-08-14 09:05 mssccprj.scc
5738 2006-08-14 09:05 ParserNSConfig.cs
9619 2006-08-14 09:05 ParserRC.cs
5657 2006-08-14 09:05 ParserResX.cs
6933 2006-08-14 09:05 Parsers.csproj
273 2006-08-14 09:05 Parsers.csproj.vspscc
2833 2006-08-14 09:05 ParserSCXml.cs
176 2006-08-14 09:05 vssver.scc In the directory OldParsers/parsers/Web References/ali-my-dev:
556 2006-08-14 09:05 Polyglot.disco
7203 2006-08-14 09:05 Polyglot.wsdl
6644 2006-08-14 09:05 Reference.cs
578 2006-08-14 09:05 Reference.map
96 2006-08-14 09:05 vssver.scc Code Sample 2:

In the directory LanguagePackCode/LocalizationProviders:
30805 2006-05-16 18:37 Altiris.VSIntegration.LocalizationProviders.xml
535 2006-06-12 13:44 AssemblyInfo.cs
9368 2006-05-02 17:29 CultureSpecificString.cs
2661 2006-05-02 17:29 DummyLocalizationProvider.cs
9612 2006-05-02 17:29 InvariantString.cs
3478 2006-05-02 17:29 LocalizationProvider.cs
4907 2006-05-02 17:29 LocalizationProviders.build
6288 2006-05-02 17:29 LocalizationProviders.csproj
1805 2006-08-14 14:19 LocalizationProviders.csproj.user
16152 2006-05-16 15:06 PolyglotLocalizationProvider.cs In the directory LanguagePackCode/LocalizationProviders/Web References/PolyglotService:
7412 2006-05-02 17:29 Polyglot.wsdl
6450 2006-05-02 17:29 Reference.cs
396 2006-05-02 17:29 Reference.map In the directory LanguagePackCode/NSLPProject:
45674 2006-07-14 18:37 LocalizedStringExtractor.cs
8695 2006-05-02 17:29 NSLPBuildEngine.cs
8130 2006-05-02 17:29 NSLPHistoryPage.cs
9419 2006-05-02 17:29 NSLPHistoryPage.resx
8529 2006-05-02 17:29 NSLPInfoPage.cs
11156 2006-05-02 17:29 NSLPInfoPage.resx
11721 2006-05-02 17:29 NSLPPerProjectOptionsPage.cs
10425 2006-05-02 17:29 NSLPPerProjectOptionsPage.resx
8001 2006-05-02 17:29 NSLPProjectConfiguration.cs
54847 2006-05-02 17:29 NSLPProjectHierarchy.cs
1882 2006-05-02 17:29 NSLPProjectOptions.cs
8518 2006-05-02 17:29 NSLPProjectRoot.cs
13485 2006-05-02 17:29 NSLPTranslationServiceOptionsPage.cs
16844 2006-05-02 17:29 NSLPTranslationServiceOptionsPage.resx
3480 2006-05-02 17:29 SubmissionHistoryEntry.cs In the directory LanguagePackCode/NSLPProject/Automation:
5680 2006-05-02 17:29 NSLPAutomationProject.cs
1266 2006-05-02 17:29 NSLPAutomationProjectRootItems.cs In the directory LanguagePackCode/Utilities:
332 2006-05-02 17:30 LocalizationFileType.cs
332 2006-07-14 18:37 LocalizedStringExtractor.cs Code Sample 3:

In the directory TranslatableSolution/TranslatableSolution:
2688 2006-08-14 09:37 TranslatableSolution.sln
11776 2006-08-14 14:29 TranslatableSolution.suo In the directory TranslatableSolution/TranslatableSolution/Altiris.TranslatableSolution:
6192 2006-08-14 09:40 Altiris.TranslatableSolution.csproj
1854 2006-08-14 14:29 Altiris.TranslatableSolution.csproj.user
4403 2006-08-14 09:42 Altiris.TranslatableSolution.xml
901 2006-08-14 09:33 AssemblyInfo.cs
442 2006-08-14 09:33 policy.6.0.Altiris.TranslatableSolution.config
2529 2006-08-14 09:33 TranslatableSolutionInstallation.cs
596 2006-08-14 09:33 TranslatableSolution.snk
1897 2006-08-14 09:33 TranslatableSolutionSolution.cs In the directory TranslatableSolution/TranslatableSolution/Altiris.TranslatableSolution/Constants:
804 2006-08-14 09:33 Guids.cs In the directory TranslatableSolution/TranslatableSolution/Altiris.TranslatableSolution.Web:
7401 2006-08-14 09:40 Altiris.TranslatableSolution.Web.csproj
162 2006-08-14 13:37 Altiris.TranslatableSolution.Web.csproj.webinfo
4637 2006-08-14 09:42 Altiris.TranslatableSolution.Web.xml
784 2006-08-14 09:33 AssemblyInfo.cs
152 2006-06-14 20:49 Console.asmx
1208 2006-08-14 09:42 Default.aspx
5482 2006-08-14 09:42 Default.aspx.cs
6399 2006-08-14 09:42 Default.aspx.ResX
97 2006-08-14 09:33 Global.asax
1763 2006-08-14 09:33 Global.asax.cs
5555 2006-06-14 20:49 Web.config In the directory TranslatableSolution/TranslatableSolution/TranslatableSolution:
3666 2006-08-14 09:33 TranslatableSolution.nsproj In the directory TranslatableSolution/TranslatableSolution/TranslatableSolution/Config:
33 2006-06-14 20:49 TranslatableSolution_Actions.config
33 2006-06-14 20:49 TranslatableSolution_Agent.config
33 2006-06-14 20:49 TranslatableSolution_AgentPolicies.config
526 2006-08-14 09:33 TranslatableSolution_Classes.config
33 2006-06-14 20:49 TranslatableSolution_Collections.config
3377 2006-08-14 09:33 TranslatableSolution.config
33 2006-06-14 20:49 TranslatableSolution_Dashboards.config
33 2006-06-14 20:49 TranslatableSolution_DataClassForeignKeys.config
33 2006-06-14 20:49 TranslatableSolution_Filters.config
35 2006-06-14 20:49 TranslatableSolution_Folders.config
33 2006-06-14 20:49 TranslatableSolution_Inventory.config
33 2006-06-14 20:49 TranslatableSolution_LP.config
56 2006-06-14 20:49 TranslatableSolution_MetaData.config
33 2006-06-14 20:49 TranslatableSolution_NotificationPolicies.config
49 2006-06-14 20:49 TranslatableSolution_PostInstallSQL.config
33 2006-06-14 20:49 TranslatableSolution_Reports.config
33 2006-06-14 20:49 TranslatableSolution_ResourceAssociations.config
39 2006-06-14 20:49 TranslatableSolution_ResourceDataClasses.config
33 2006-06-14 20:49 TranslatableSolution_ResourceFolders.config
33 2006-06-14 20:49 TranslatableSolution_ResourceTypes.config
33 2006-06-14 20:49 TranslatableSolution_Security.config
57 2006-06-14 20:49 TranslatableSolution_SQL.config
33 2006-06-14 20:49 TranslatableSolution_StandardResources.config
41 2006-06-14 20:49 TranslatableSolution_StaticStrings.config
35 2006-06-14 20:49 TranslatableSolution_Strings.config
33 2006-06-14 20:49 TranslatableSolution_Subscribers.config
33 2006-06-14 20:49 TranslatableSolution_SWD.config In the directory TranslatableSolution/TranslatableSolution/TranslatableSolution/SetupTemplates:
10925 2006-08-14 09:33 Altiris_TranslatableSolution.xml In the directory TranslatableSolution/TranslatableSolution/TranslatableSolutionLP:
8762 2006-08-14 10:42 TranslatableSolutionLP.nslpproj In the directory TranslatableSolution/TranslatableSolution/TranslatableSolutionLP/Config:
4593 2006-08-14 09:35 TranslatableSolutionLP.config In the directory TranslatableSolution/TranslatableSolution/TranslatableSolutionLP/LanguageDependentFiles/de:
60 2006-08-14 09:42 Altiris.TranslatableSolution.ClassStrings.config
640 2006-08-14 09:42 Altiris.TranslatableSolution.Web.ClassStrings.config
54 2006-08-14 09:42 TranslatableSolution.DataClassColumns.config
632 2006-08-14 09:42 TranslatableSolution.ItemStrings.config
54 2006-08-14 09:42 TranslatableSolution.ReportStrings.config
54 2006-08-14 09:42 TranslatableSolution.SecurityStrings.config
60 2006-08-14 09:42 TranslatableSolution.StaticStrings.config
54 2006-08-14 09:42 TranslatableSolution.Strings.config
40 2006-08-14 09:42 UIMessages.xml In the directory TranslatableSolution/TranslatableSolution/TranslatableSolutionLP/LanguageDependentFiles/es:
60 2006-08-14 09:42 Altiris.TranslatableSolution.ClassStrings.config
644 2006-08-14 09:42 Altiris.TranslatableSolution.Web.ClassStrings.config
54 2006-08-14 09:42 TranslatableSolution.DataClassColumns.config
632 2006-08-14 09:42 TranslatableSolution.ItemStrings.config
54 2006-08-14 09:42 TranslatableSolution.ReportStrings.config
54 2006-08-14 09:42 TranslatableSolution.SecurityStrings.config
60 2006-08-14 09:42 TranslatableSolution.StaticStrings.config
54 2006-08-14 09:42 TranslatableSolution.Strings.config
40 2006-08-14 09:42 UIMessages.xml In the directory TranslatableSolution/TranslatableSolution/TranslatableSolutionLP/LanguageDependentFiles/fr:
60 2006-08-14 09:42 Altiris.TranslatableSolution.ClassStrings.config
638 2006-08-14 09:42 Altiris.TranslatableSolution.Web.ClassStrings.config
54 2006-08-14 09:42 TranslatableSolution.DataClassColumns.config
632 2006-08-14 09:42 TranslatableSolution.ItemStrings.config
54 2006-08-14 09:42 TranslatableSolution.ReportStrings.config
54 2006-08-14 09:42 TranslatableSolution.SecurityStrings.config 60   2006-08-14   09:42   TranslatableSolution.StaticStrings.config
54 2006-08-14 09:42 TranslatableSolution.Strings.config
40 2006-08-14 09:42 UIMessages.xml In the directory TranslatableSolution/TranslatableSolution/TranslatableSolutionLP/LanguageDependentFiles/ja:
60    2006-08-14   09:42   Altiris.TranslatableSolution.ClassStrings.config
646   2006-08-14   09:42   Altiris.TranslatableSolution.Web.ClassStrings.config
54    2006-08-14   09:42   TranslatableSolution.DataClassColumns.config
632   2006-08-14   09:42   TranslatableSolution.ItemStrings.config
54    2006-08-14   09:42   TranslatableSolution.ReportStrings.config
54    2006-08-14   09:42   TranslatableSolution.SecurityStrings.config
60    2006-08-14   09:42   TranslatableSolution.StaticStrings.config
54 2006-08-14 09:42 TranslatableSolution.Strings.config
40 2006-08-14 09:42 UIMessages.xml In the directory TranslatableSolution/TranslatableSolution/TranslatableSolutionLP/LanguageDependentFiles/zh-CHS:
60    2006-08-14   09:42   Altiris.TranslatableSolution.ClassStrings.config
657   2006-08-14   09:42   Altiris.TranslatableSolution.Web.ClassStrings.config
54    2006-08-14   09:42   TranslatableSolution.DataClassColumns.config
664   2006-08-14   09:42   TranslatableSolution.ItemStrings.config
54    2006-08-14   09:42   TranslatableSolution.ReportStrings.config
54    2006-08-14   09:42   TranslatableSolution.SecurityStrings.config
60    2006-08-14   09:42   TranslatableSolution.StaticStrings.config
54 2006-08-14 09:42 TranslatableSolution.Strings.config
40 2006-08-14 09:42 UIMessages.xml In the directory TranslatableSolution/TranslatableSolution/TranslatableSolutionLP/LanguageIndependentFiles:
17    2006-08-14   09:42   Altiris.TranslatableSolution.ClassStrings.config
580   2006-08-14   09:42   Altiris.TranslatableSolution.Web.ClassStrings.config
51    2006-08-14   09:42   TranslatableSolution.DataClassColumns.config
589   2006-08-14   09:42   TranslatableSolution.ItemStrings.config
51    2006-08-14   09:42   TranslatableSolution.ReportStrings.config
51    2006-08-14   09:42   TranslatableSolution.SecurityStrings.config
57    2006-08-14   09:42   TranslatableSolution.StaticStrings.config
51 2006-08-14 09:42 TranslatableSolution.Strings.config
40 2006-08-14 09:42 UIMessages.xml In the directory TranslatableSolution/TranslatableSolution/TranslatableSolutionLP/SetupTemplates:
9531 2006-08-14 09:35 TranslatableSolutionLP.wxs

What is claimed is:

1. A development environment for extracting and accumulating translatable material from software development projects modified by individual developers, comprising:
   one or more processors;
   a first set of computer readable media comprising at least one medium upon which is stored project computer instructions executable by said processors to achieve the functions of:
      (i) accessing a source code project,
      (ii) building an application from an accessed source code project,
      (iii) processing the source code projects to identify source code files to parse,
      (iv) parsing the identified source code files to extract user-viewable content in need of translation,
      (v) connecting to a translations database through a database access service, and
      (vi) storing user-viewable content to the translations database through the database access service;
   a second set of computer readable media comprising at least one medium upon which is stored database computer instructions executable by said processors to achieve the functions of:
      (i) maintaining a translations database containing translations, wherein the translations of said database are referencable by a combination of a source information extracted in parsing and a locality specification,
      (ii) operating a database access service to said database connectable by the build process implemented by said project computer instructions,
      (iii) storing user-viewable content to the translations database through the database access service as requested by said project instructions, and
      (iv) retrieving the stored user-viewable content in a format suitable for transmission to a human translator; and
   wherein said database instructions are interoperable with more than one instance of said project computer instructions located at different developer computers.

2. A development environment according to claim 1 wherein said project computer instructions are operable to parse source code files not located to a source code repository.

3. A development environment according to claim 1 wherein said project computer instructions are operable to parse source code files located in a developer's sandbox.

4. A development environment according to claim 1 wherein said project computer instructions are operable to parse source code files located at a developer computer.

5. A development environment according to claim 1 wherein said project computer instructions implement a plurality of parsers organized by file type.

6. A development environment according to claim 1 for furthermore inserting locality translations into a source code project, wherein:
   said project instructions are further executable to perform the functions of:
      (vii) requesting a translation from the translations database through the database access service by a request referencing source information and a locality specification, and
      (viii) inserting the translation in place of the corresponding user-viewable content into the original source code file or a copy thereof; and said database instructions are further executable to perform the functions of:

(v) receiving, through the access service and at a request made by a connection thereto, translated content corresponding to the user-viewable content, and associating the translated content to its user-viewable content and a locality, and (vi) providing, through the access service and at a request made by a connection thereto, translated content corresponding to the user-viewable content referenced by source information and a locality specification included with the request.

7. A development environment according to claim 1, wherein said project and database instructions are operable to provide a coherent set of natural language strings encompassing the user-viewable material of more than one version of a software project.

8. A development environment according to claim 1, wherein the instructions for said parsing are executable by a software development environment.

9. A development environment according to claim 1, wherein the database access service provides access to a translations database across a network.

10. A development environment according to claim 1, wherein said instructions for building, processing and parsing the source code files are located in or referenced by an integration language pack.

11. A method of providing localized versions of applications, comprising the steps of:

selecting a desired set of localities for which an application is to be built;
operating a shared translations database;
developing source code project at a plurality of developer computers, wherein the source code project may exist at each of the developer computers in its own version;
at a plurality of developer computers, processing the version of the source code project there located to identify source code files to parse;
parsing the identified source code files to extract user-viewable content in need of translation;
storing to the shared translations database the user-viewable content extracted from the plurality of developer computers;
storing to the translations database localized versions of the user-viewable content, referenced by a combination of a source information extracted in parsing and a locality specification;
substituting localized versions of the source information contained in the identified source code files;
building the the source code files as substituted to produce an application.

12. A method according to claim 11, wherein in said substituting a direct substitution is made of localized versions for the source versions of the user-viewable content, thereby producing a localized version of the source code files in one of the selected localities.

13. A method according to claim 11, wherein in said substituting functional references are inserted into the identified source code corresponding to the source versions of the user-viewable content, and wherein said method further comprises the steps of:

creating a customer translation database from said translations database;
providing the application to a customer; and
configuring the application to functionally reference the localized versions contained in the customer translation database, thereby presenting localized user-viewable content to the end-users of the customer.

14. A method according to claim 11, wherein in said parsing is performed on source code not located in a developer's sandbox.

15. A method of providing localized versions of applications, comprising the steps of:

selecting a desired set of localities for which an application is to be built;
operating a translations database;
developing source code project;
selecting a set of localities;
processing the source code project to identify source code files to parse;
parsing the identified source code files to extract user-viewable content in need of translation;
storing localized versions of the extracted user-viewable content to the translations database, referenced by a combination of a source information extracted in parsing and a locality specification;
creating a locality directory for each of the selected localities;
storing to the locality directories a copy of the source code project wherein localized versions of the source information contained in the identified source code files are substituted to the source code files in the locality directories; and
building the the source code files as substituted to produce localized applications.

16. A set of computer-readable media comprising one or more storage mediums having stored thereon computer-executable instructions for extracting and accumulating translatable material from software development projects modified by individual developers, wherein said instructions are executable by one or more processors to achieve the functions of:

(i) maintaining a translations database containing translations, wherein the translations of said database are referencable by a combination of a source information and a locality specification;

(ii) operating a database access service to said database connectable by developer computers;

(iii) at a developer computer, accessing a source code project;

(iv) at a developer computer, processing a source code project to identify source code files to parse;

(v) at a developer computer, parsing the identified source code files to extract user-viewable content in need of translation;

(vi) connecting a developer computer to a translations database through a database access service;

(vii) storing user-viewable content to the translations database through the database access service as requested by a developer computer;

(viii) retrieving the stored user-viewable content in a format suitable for transmission to a human translator; and (ix) building an application from an accessed source code project.

17. A set of computer-readable media according to claim 16, wherein said instructions are executable by one or more processors to achieve the functions of:

(x) storing translated content corresponding to the user-viewable content stored to the translations database, associating the translated content to its user-viewable content and a locality;

(xi) at a developer computer, requesting translations from the translations database through the database access service by a request referencing source information and a locality specification;

(xii) providing, through the access service and at a request made by a connection thereto, translated content corresponding to the user-viewable content referenced by source information extracted in parsing and a locality specification included with the request; and (xiii) inserting translations in place of the corresponding user-viewable content into the original source code file or a copy thereof.

18. A set of computer-readable media according to claim 16, wherein said instructions are further executable to parse source code files not located to a source code repository.

19. A set of computer-readable media according to claim 16, wherein said instructions are further executable to parse source code files located in a developer's sandbox.

20. A set of computer-readable media according to claim 16, wherein said instructions are further executable to parse source code files located at a developer computer.

21. A set of computer-readable media according to claim 16, wherein said instructions for processing a source code project to identify source code files to parse and parsing the identified source code files to extract user-viewable content in need of translation are located in or referenced by an integration language pack.

* * * * *